US006308154B1

(12) United States Patent
Williams et al.

(10) Patent No.: US 6,308,154 B1
(45) Date of Patent: Oct. 23, 2001

(54) METHOD OF NATURAL LANGUAGE COMMUNICATION USING A MARK-UP LANGUAGE

(75) Inventors: Laird C. Williams, St. Charles; Anthony Dezonno, Bloomingdale; Mark J. Power, Carol Stream; Kenneth Venner, Winfield, all of IL (US); Jared Bluestein, Wilcot, NH (US); Jim F. Martin, Woodside, CA (US); Darryl Hymel, Batavia; Craig R. Shambaugh, Wheaton, both of IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/549,057

(22) Filed: Apr. 13, 2000

(51) Int. Cl.[7] .......................... G10L 15/04; G10L 21/06; G10L 15/02

(52) U.S. Cl. .......................... 704/254; 704/257; 704/251; 704/200.1; 704/201; 704/231; 704/235

(58) Field of Search .................................... 704/254, 235, 704/258, 244, 249, 233, 200.1, 201, 231, 251, 257

(56) References Cited

U.S. PATENT DOCUMENTS

| | | | | |
|---|---|---|---|---|
| 3,646,576 | * | 2/1972 | Griggs | 704/235 |
| 5,625,749 | * | 4/1997 | Goldenthal | 704/254 |
| 5,636,325 | * | 6/1997 | Farrett | 704/258 |
| 5,708,759 | * | 1/1998 | Kemeny | 704/235 |
| 5,933,805 | * | 8/1999 | Boss et al. | 704/249 |
| 5,960,447 | * | 9/1999 | Holt et al. | 704/235 |
| 5,983,176 | * | 11/1999 | Hoffert et al. | 704/233 |

OTHER PUBLICATIONS

TextAssist User's Guide (Creative Labs Inc. ©Feb. 1994.*

* cited by examiner

*Primary Examiner*—Richemond Dorvil
*Assistant Examiner*—Daniel A. Nolan
(74) *Attorney, Agent, or Firm*—Welsh & Katz, Ltd.

(57) ABSTRACT

A method and apparatus are provided for encoding a spoken language. The method includes the steps recognizing a verbal content of the spoken language, measuring an attribute of the recognized verbal content and encoding the recognized and measured verbal content.

39 Claims, 1 Drawing Sheet

METHOD OF NATURAL LANGUAGE COMMUNICATION USING A MARK-UP LANGUAGE

FIELD OF THE INVENTION

The field of the invention relates to human speech and more particularly to methods of encoding human speech.

BACKGROUND OF THE INVENTION

Methods of encoding human speech are well known. One method uses letters of an alphabet to encode human speech in the form of textual information. Such textual information may be encoded onto paper using a contrasting ink or it may be encoded onto a variety of other mediums. For example, human speech may first be encoded under a textual format, converted into an ASCII format and stored on a computer as binary information.

The encoding of textual information, in general, is a relatively efficient process. However, textual information often fails to capture the entire content or meaning of speech. For example, the phrase "Get out of my way" may be interpreted as either a request or a threat. Where the phase is recorded as textual information, the reader would, in most cases, not have enough information to discern the meaning conveyed.

However, if the phrase "get out of my way" were heard directly from the speaker, the listener would probably be able to determine which meaning was intended. For example, if the words were spoken in a loud manner, the volume would probably impart threat to the words. Conversely, if the words were spoken softly, the volume would probably impart the context of a request to the listener.

Unfortunately, verbal clues can only be captured by recording the spectral content of speech. Recording of the spectral content, however, is relatively inefficient because of the bandwidth required. Because of the importance of speech, a need exists for a method of recording speech which is textual in nature, but which also captures verbal clues.

SUMMARY

A method and apparatus are provided for encoding a spoken language. The method includes the steps recognizing a verbal content of the spoken language, measuring an attribute of the recognized verbal content and encoding the recognized and measured verbal content.

DETAILED DESCRIPTION OF A PREFERRED EMBODIMENT

Figure 1:
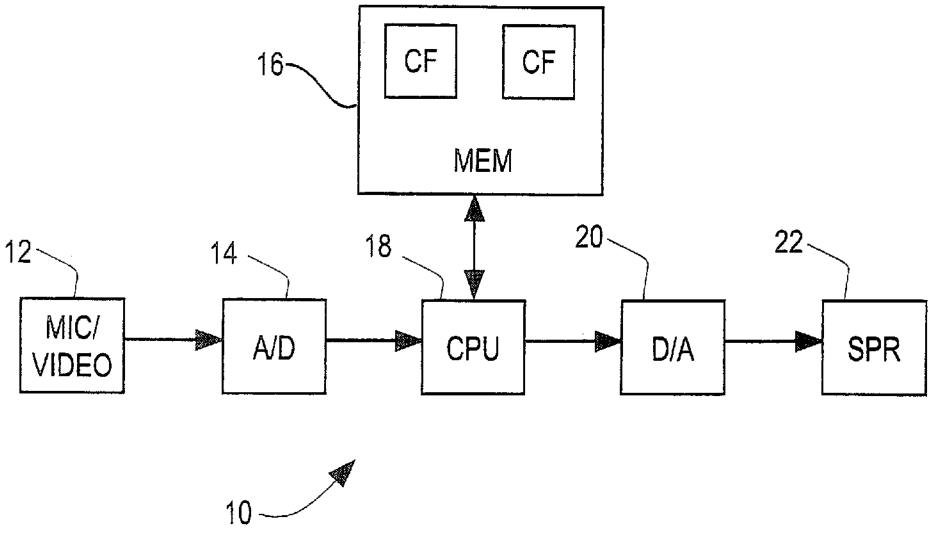
FIG. 1 is a block diagram of a language encoding system under an illustrated embodiment of the invention.
Figure 2:
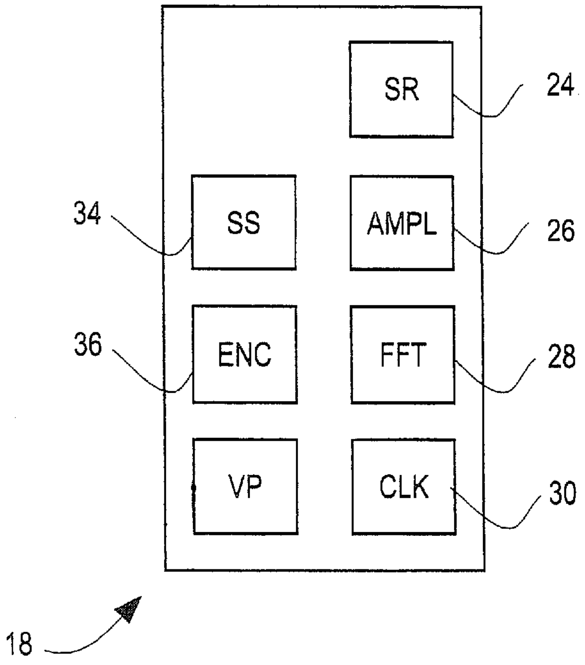
FIG. 2 is a block diagram of a processor of the system of FIG. 1.
Figure 3:
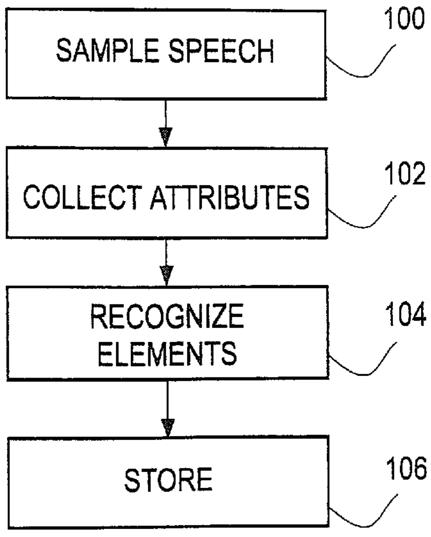
FIG. 3 is a flow chart of process steps that may be used by the system of FIG. 1.

FIG. 1 is a block diagram of a system 10, shown generally, for encoding a spoken (i.e., a natural) language. FIG. 3 depicts a flow chart of process steps that may be used by the system 10 of FIG. 1. Under the illustrated embodiment, speech is detected by a microphone 12, converted into digital samples 100 in an analog to digital (A/D) converter 14 and processed within a central processing unit (CPU) 18.

Processing within the CPU 18 may include a recognition 104 of the verbal content or, more specifically, of the speech elements (e.g., phonemes, morphemes, words, sentences, etc.) as well as the measurement and collection of verbal attributes 102 relating to the use of the recognized words or phonetic elements. As used herein, recognizing a speech element means identifying a symbolic character or character sequence (e.g., an alphanumeric textual sequence) that would be understood to represent the speech element. Further, an attribute of the spoken language means the measurable carrier content of the spoken language (e.g., tone, amplitude, etc.). Measurement of attributes may also include the measurement of any characteristic regarding the use of a speech element through which a meaning of the speech may be further determined (e.g., dominant frequency, word or syllable rate, inflecton, pauses, etc.).

Once recognized, the speech along with the speech attributes may be encoded and stored in a memory 16, or the original verbal content may be recreated for presentation to a listener either locally or at some remote location. The recognized speech and speech attributes may be encoded for storage and/or transmission under any format, but under a preferred embodiment the recognized speech elements are encoded under an ASCII format interleaved with attributes encoded under a mark-up language format.

Alternatively, the recognized speech and attributes may be stored or transmitted as separate sub-files of a composite file. Where stored in separate sub-files, a common time base may be encoded into the overall composite file structure which allows the attributes to be matched with a corresponding element of the recognized speech.

Under an illustrated embodiment, speech may be later retrieved from memory 16 and reproduced either locally or remotely using the recognized speech elements and attributes to substantially recreate the original speech content. Further, attributes and inflection of the speech may be changed during reproduction to match presentation requirements.

Under the illustrated embodiment, the recognition of speech elements may be accomplished by a speech recognition (SR) application 24 operating within the CPU 18. While the SR application may function to identify individual words, the application 24 may also provide a default option of recognizing phonetic elements (i.e., phonemes).

Where words are recognized, the CPU 18 may function to store the individual words as textual information. Where word recognition fails for particular words or phrases, the sounds may be stored as phonetic representations using appropriate symbols under the International Phonetic Alphabet. In either case, a continuous representation of the recognized sounds of the verbal content may be stored 106 in a memory 16.

Concurrent with word recognition, speech attributes may also be collected. For example, a clock 30 may be used to provide markers (e.g., SMPTE tags for time-synch information) that may be inserted between recognized words or inserted into pauses. An amplitude meter 26 may be provided to measure a volume of speech elements.

As another feature of the invention, the speech elements may be processed using a fast fourier transform (FFT) application 28 which provides one or more FFT values. From the FFT application 28, a spectral profile may be provided of each word. From the spectral profile a dominant frequency or a profile of the spectral content of each word or speech element may be provided as a speech attribute. The dominant frequency and subharmonics provide a recognizable harmonic signature that may be used to help identify the speaker in any reproduced speech segment.

Under an illustrated embodiment, recognized speech elements may be encoded as ASCII characters. Speech attributes may be encoded within an encoding application 36 using a standard mark-up language (e.g., XML, SGML, etc.) and mark-up insert indicators (e.g., brackets).

Further, mark-up inserts may be made based upon the attribute involved. For example, amplitude may only be inserted when it changes from some previously measured value. Dominant frequency may also be inserted only when some change occurs or when some spectral combination or change of pitch is detected. Time may be inserted at regular intervals and also whenever a pause is detected. Where a pause is detected, time may be inserted at the beginning and end of the pause.

As a specific example, a user may say the words "Hello, this is John" into the microphone 12. The audio sounds of the statement may be converted into a digital data stream in the A/D converter 14 and encoded within the CPU 18. The recognized words and measured attributes of the statement may be encoded as a composite of text and attributes in the composite data stream as follows:

<T:0.0><Amplitude:A1><DominentFrequency:127Hz>Hello
<T:0.25><T:0.5>this is John<Amplitude:A2>John.

The first mark-up element "<T:0.0>" of the statement may be used as an initial time marker. The second mark-up element "<Amplitude:A1>" provides a volume level of the first spoken word "Hello." The third mark-up element "<DominantFrequency:127 Hz>" gives indication of the pitch of the first spoken word "Hello."

The fourth and fifth mark-up elements "<T:0.25>" and "<T:0.5>" give indication of a pause and a length of the pause between words. The sixth mark-up element "<Amplitude:A2>" gives indication of a change in speech amplitude. and a measure of the volume change between "this is" and "John."

Following encoding of the text and attributes, the composite data stream may be stored as a composite data file 24 in memory 16. Under the appropriate conditions, the composite file 24 may be retrieved and re-created through a digital to analog (D/A) converter 20 and a speaker 22.

Upon retrieval, the composite file 24 may be transferred to a speech synthesizer 34. Within the speech synthesizer, the textual words may be used as a search term for entry into a lookup table for creation of an audible version of the textual word. The mark-up elements may be used to control the rendition of those words through the speaker.

For example, the mark-up elements relating to amplitude may be used to control volume. The dominant frequency may be used to control the perception of whether the voice presented is that of a man or a woman based upon the dominant frequency of the presented voice. The timing of the presentation may be controlled by the mark-up elements relating to time.

Under the illustrated embodiment, the recreation of speech from a composite file allows aspects of the recreation of the encoded voice to be altered. For example, the gender of the rendered voice may be changed by changing the dominant frequency. A male voice may be made to appear female by elevating the dominant frequency. A female may appear to be male by lowering the dominant frequency.

A specific embodiment of a method and apparatus encoding a spoken language has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of communicating using a spoken language comprising the steps of:

recognizing a verbal content of the spoken language;

measuring a magnitude of an attribute of the recognized verbal content; and encoding the recognized verbal content and measured magnitude of the attribute of the verbal content under a textual format adapted to retain both the recognized verbal content and the measured magnitude of the attribute.

2. The method of communicating as in claim 1 wherein the step of encoding further comprises interleaving the recognized verbal content with the measured attribute.

3. The method of communicating as in claim 2 wherein the step of interleaving the recognized verbal content with the measured attribute further comprises using a mark-up language to differentiate the recognized verbal content from the encoded measured attribute.

4. The method of communicating as in claim 1 wherein the step of recognizing the verbal content of the spoken language further comprises recognizing words of the spoken language.

5. The method of communicating as in claim 4 wherein the step of recognizing words of the spoken language further comprises associating specific alphanumeric sequences with the recognized words.

6. The method of communicating as in claim 1 wherein the step of recognizing the verbal content of the spoken language further comprises recognizing phonetic sounds of the spoken language.

7. The method of communicating as in claim 6 wherein the step of recognizing phonetic sounds of the spoken language further comprises associating specific alphanumeric sequences with the recognized phonetic sounds.

8. The method of communicating as in claim 1 wherein the step of measuring the attribute further comprises measuring at least one of a tone, amplitude, FFT values, power frequency, pitch, pauses, background noise and syllabic speed of an element of the spoken language.

9. The method of communicating as in claim 8 wherein the step of measuring the at least one of a tone, amplitude, FFT value, power, frequency, pitch pauses, background noise and syllabic speed of an element of the spoken language further comprises encoding the measured attribute of the at least measured one under a mark-up language format.

10. The method of communicating as in claim 9 wherein the measured element further comprises a word of the spoken language.

11. The method of communicating as in claim 9 wherein the measured element further comprises a phonetic sound of the spoken language.

12. The method of communicating as in claim 1 further comprising substantially recreating the spoken language content from the encoded recognized and measured attributes of the spoken language.

13. The method of communicating as in claim 12 further comprising changing a perceived gender of the recreated spoken language.

14. The method of communicating as in claim 1 further comprising storing the encoded verbal content.

15. The method of communicating as in claim 1 further comprising reproducing in audio form the encoded verbal content.

16. An apparatus for communicating using a spoken language, such apparatus comprising:

means for recognizing a verbal content of the spoken language;

means for measuring a magnitude of an attribute of the recognized verbal content; and means for encoding the recognized verbal content and measured magnitude of the attribute of the verbal content under a textual format adapted to retain both the recognized verbal content and the measured magnitude of the attribute.

17. The apparatus for communicating as in claim 16 wherein the means for encoding further means for comprises interleaving the recognized verbal content with the measured attribute.

18. The apparatus for communicating as in claim 17 wherein the means for interleaving the recognized verbal content with the measured attribute further comprises means for using a mark-up language to differentiate the recognized verbal content from the encoded measured attribute.

19. The apparatus for communicating as in claim 16 wherein the means for recognizing the verbal content of the spoken language further comprises means for recognizing words of the spoken language.

20. The apparatus for communicating as in claim 19 wherein the means for recognizing words of the spoken language further comprises means for associating specific alphabetic sequences with the recognized words.

21. The apparatus for communicating as in claim 16 wherein the means for recognizing the verbal content of the spoken language further comprises means for recognizing phonetic sounds of the spoken language.

22. The apparatus for communicating as in claim 21 wherein the means for recognizing phonetic sounds of the spoken language further comprises means for associating specific alphabetic sequences with the recognized phonetic sounds.

23. The apparatus for communicating as in claim 16 wherein the means for measuring the attribute further comprises means for measuring at least one of a tone, amplitude, FFT values, power, frequency, pitch, pauses, background noise and syllabic speed of an element of the spoken language.

24. The apparatus for communicating as in claim 23 wherein the means for measuring the at least one of a tone, amplitude, FFT value, power, frequency, pitch, pauses, background noise and syllabic speed of an element of the spoken language further comprises means for encoding the measured attribute of the at least measured one under a mark-up language format.

25. The apparatus for communicating as in claim 24 wherein the measured element further comprises a word of the spoken language.

26. The apparatus for communicating as in claim 24 wherein the measured element further comprises a phonetic sound of the spoken language.

27. The apparatus for communicating as in claim 16 further comprising means for substantially recreating the spoken language content from the encoded recognized and measured attributes of the spoken language.

28. The apparatus for communicating as in claim 16 further comprising means for changing a perceived gender of the recreated spoken language.

29. The apparatus for communicating as in claim 16 further comprising means for storing the encoded verbal content.

30. The apparatus for communicating as in claim further comprising means for reproducing in audio form the encoded verbal content.

31. An apparatus for communicating using a spoken language, such apparatus comprising:

a speech recognition module adapted to recognize a verbal content of the spoken language;

an attribute measuring application adapted to measure a magnitude of an attribute of the recognized verbal content; and an encoder adapted to encode the recognized verbal content and measured magnitude of the attribute of the verbal content under a textual format which retains both the recognized verbal content and the measured magnitude of the attribute.

32. The apparatus for communicating as in claim 31 wherein the encoder further means an interleaving processor adapted to interleave the recognized verbal content with the measured attribute.

33. The apparatus for communicating as in claim 32 wherein the interleaving processor further comprises a mark-up processor adapted to use a mark-up language to differentiate the recognized verbal content from the encoded measured attribute.

34. The apparatus for communicating as in claim 31 wherein the speech recognition module further comprises a phonetic interpreter adapted to recognize phonetic sounds of the spoken language.

35. The apparatus for communicating as in claim 31 wherein the attribute measuring application further comprises a timer.

36. The apparatus for communicating as in claim 31 wherein the attribute measuring application further comprises a fast fourier transform application.

37. The apparatus for communicating as in claim 31 wherein the attribute measuring application further comprises an amplitude measurement application.

38. The apparatus for communicating as in claim 31 further comprising a memory adapted to store the encoded verbal content.

39. The apparatus for communicating as in claim 31 further comprising a speaker for recreating in verbal form the encoded verbal content.

* * * * *